June 15, 1965 B. L. PERDUE Re. 25,799

ROCK CRUSHER

Original Filed March 8, 1962 2 Sheets-Sheet 1

Inventor
Benton L. Perdue
by Dawson, Tilton, Fallon, Lungmus & Alexander
Attys

ROCK CRUSHER
Original Filed March 8, 1962 2 Sheets-Sheet 2
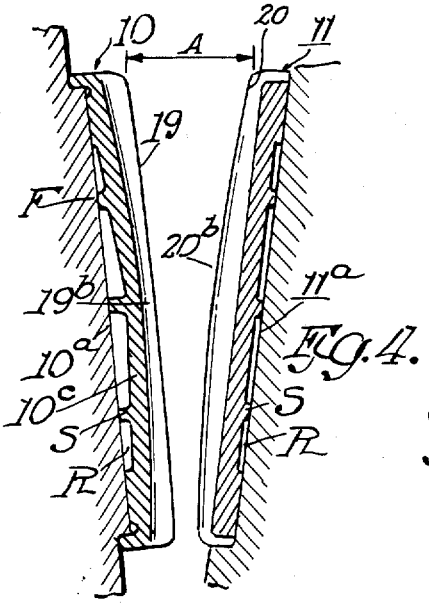
FIG. 4.
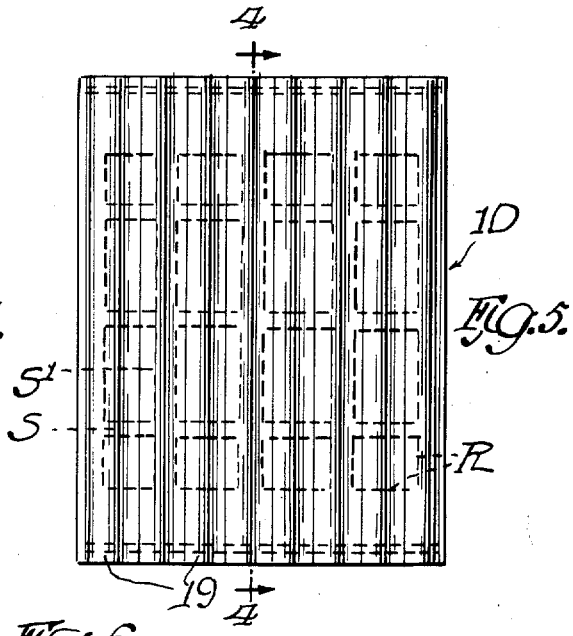
FIG. 5.
FIG. 6.
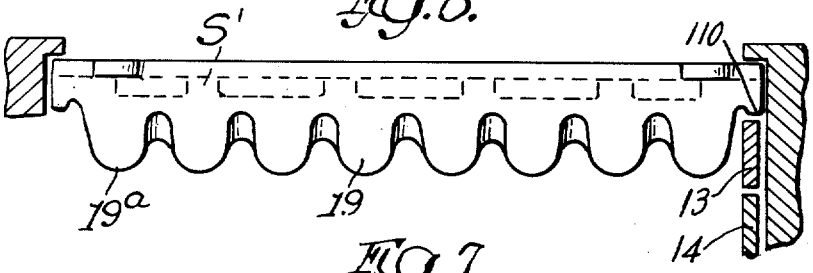
FIG. 7.
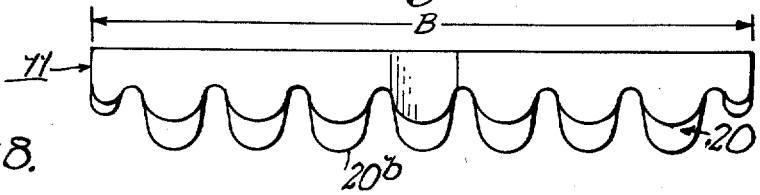
FIG. 8.
FIG. 9.
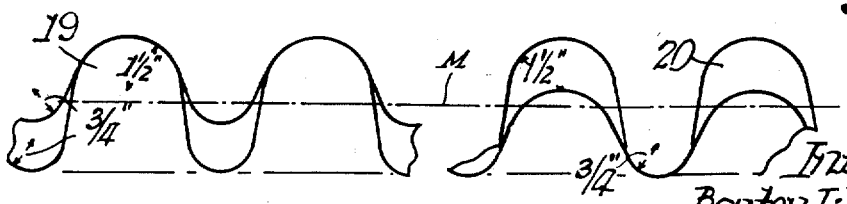
Inventor
Benton L. Perdue
by Dawson, Tilton, Fallon
Lungmus & Alexander: Attys United States Patent Office Re. 25,799
Reissued June 15, 1965

25,799
ROCK CRUSHER

Benton L. Perdue, Portland, Oreg., assignor to Esco Corporation, Portland, Oreg., a corporation of Oregon Original No. 3,144,214, dated Aug. 11, 1964, Ser. No. 178,361, Mar. 8, 1962. Application for reissue Sept. 24, 1964, Ser. No. 410,341
9 Claims. (Cl. 241—291)

Matter enclosed in heavy brackets [ ] appears in the original patent but forms no part of this reissue specification; matter printed in italics indicates the additions made by reissue.

This invention relates to crushers for rock ore, and like lumpy materials, and, more particularly, to a replaceable die or facing plate for a crusher jaw.

Crushers employ a movable jaw to urge the material against a stationary jaw. Two basic types have evolved—the older Blake type, in which the movable jaw is hinged at the top on a dead shaft, with the reciprocating motion being applied by means of a double toggle arrangement suspended from an eccentric shaft; and the overhead eccentric type, in which the movable jaw and the pitman frame to which it is connected are suspended from a live, rotating, eccentric shaft which transmits both a reciprocating motion and a rotary motion to the movable jaw. In the latter type, there is a certain amount of force feeding the crusher as well as the normal gravity flow.

In either type, the jaws are provided with renewable confronting faces—these, with the confining side walls, i.e., cheek plates—defining the crushing area. The principal wear is on the confronting faces, and this has been the problem facing the art—how to get long life while still retaining the desired degree of crushing as wear progresses. This is solved by the instant invention, relative to both basic crusher types, and the provision of jaw dies for this purpose constitutes a principal object of the invention.

Another object is to provide a jaw die characterized by a novel tooth configuration which is advantageous in providing increased efficiency, i.e., long term, high level output of crushed material of the desired size or size distribution. The jaw dies of the invention, like their prior art predecessors, are generally rectangular in outline so as to fit into existing equipment, and are equipped with vertically-extending teeth or corrugations.

Still another object is to provide a renewable jaw characterized by relatively massive teeth, yet which successfully resist undesirable mushrooming or peening.

Yet another object is to provide stationary and movable jaws uniquely contoured in their confronting faces which develop increased productivity by reducing the slippage, or belching, of the rock, particulraly in the coarse zone, but also in all lower or subsequent areas in the crushing chamber, and, further, by giving a greater discharge volume in the fines zone, reducing the packing and constriction which normally take place in this area of the crushing chamber. Prior art, in the design of crusher jaws, has failed to remove a very common problem of uneven wear in the crushing faces of the jaws due to the shape of the crushing chamber defined by the jaws and cheek plates.

A further object of the invention is to provide confronting crusher jaw faces characterized by height variations in the vertically-extending corrugations which compensate for this difference in wear rate in the various areas, maintaining for a much longer period of time the increased production achieved by this invention as compared to the prior art.

Other objects and advantages of the invention may be seen in the details of construction and operation set down in this specification.

The invention will be described in conjunction with the accompayning drawings, in which—

FIG. 4 is a section view of a modified form of jaw die taken along the line 4—4 of FIG. 5;

FIG. 5 is an elevational view of the working or confronting face of the stationary jaw seen in FIG. 4;

FIG. 6 is an enlarged end view of the stationary jaw of FIGS. 4 and 5 with a fragment of the crusher frame also being shown in section;

FIG. 7 is an enlarged end view of the movable jaw seen in FIG. 4;

FIG. 8 is an enlarged fragmentary end view of the stationary jaw showing the tooth profile thereof when viewed from the end of the jaw; and FIG. 9 is a view similar to FIG. 8 but of the tooth profile of the movable jaw when viewed from the end of the jaw.

Figure 1:
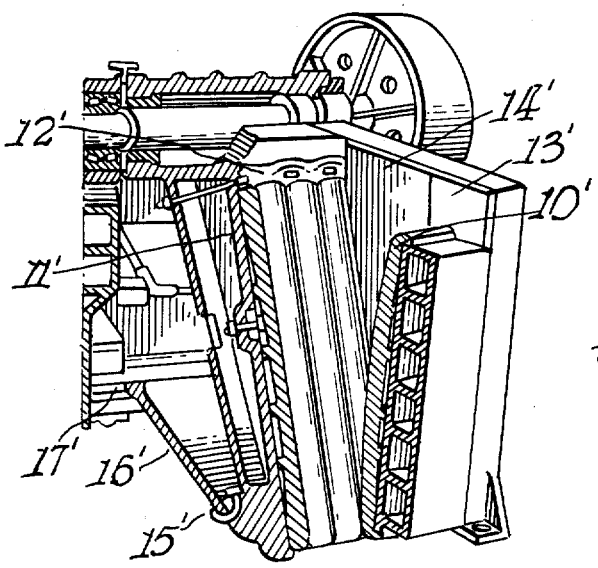
FIG. 1 is a fragmentary perspective view, partially broken away, of an overhead eccentric-type crusher.

In FIG. 1, the overhead eccentric-type of crusher is seen, and is seen to include a stationary jaw [10] *10'* and a movable jaw [11] *11'*. The movable jaw [11] *11'* is equipped with a pitman wedge [12] *12'* helping to maintain the replaceable die in position. The numeral [13] *13'* designates the usual cheek [plates] *plate*. The stationary jaw is usually retained in the crusher by flanges provided on the jaw [18] *18'* of FIG. 2 as at [18a] *18'a*. This prevents vertical movement of the jaw. Lateral movement is prevented by driving the cheek plates [13] *13'* into position alongside the stationary jaw [10] *10'* with the cheek plates resting against ledges of the [machine frame] *stationary jaw* as at [10a] *110* of FIG. 6.

The numeral [14] *14'* designates a heel plate usually found in this type construction, while the numerals [15–17] *15'–17'* have to do with the usual pitman and toggle construction, the numeral [15] *15'* referring to the pitman toggle seat, the numeral [16] *16'* to the toggle plate, and the numeral [17] *17'* to the toggle block.

The bottom or discharge opening in conventional crushers may be of the order of one inch on the smaller jaw crusher, ranging up to ten or twelve inches, or perhaps even more on the larger sizes. The weight range of the jaws generally is from 500 pounds up to 10,000 pounds or more. Normally, the stationary jaw sits approximately vertically in the crusher, while the movable jaw slopes, and its length is usually enough in excess of that of the stationary jaw to compensate for this sloping position, resulting in a crushing chamber of approximately continuous vertical height across the chamber.

The speed of a crusher may be in the range of 175–300 r.p.m., i.e., impacts. The dimension first given in referring to a crusher is usually that of the spacing between the jaws, and this usually will range from 10" to 66" as at A of FIG. 4. The second given dimension is that of the width of the jaws, and this may vary between 16" and 84" as at B in FIG. 7. For example, in a medium sized crusher, it would be characterized as 42 x 48", and for this the overall height of the jaws would be in the range of 7½ to 9 feet. Ordinarily, the feed opening and height are so related as to keep the nip angle at less than about 30° so as to avoid belching. The nip angle is defined as the angle included between the jaws at the beginning of a crushing stroke.

With prior art, a serious problem of accelerated wear on the lower end, of particularly the stationary jaw, has led to the common practice of curving the face of the jaw in order to create a greater degree of parallelism between the lower portions of the opposing jaws. While this has helped to increase the crushing capacity of the machine regarding smaller material, it has adversely affected crushing in the upper portion as this curvature has increased the nip angle to the point that serious slippage has taken place resulting in less efficiency and accelerated wear.

With this invention, I find that I can either eliminate, or at least greatly reduce, the curvature or parallelism between the opposing jaws and due to the curvature of the root or valley and the greatly increased area of the discharge opening, effect substantial increases in production and at the same time, by using the straight tooth crown, achieve an efficient nip angle in the upper or coarse crushing area.

There are certain inherent disadvantages or shortcomings of jaw crushers in general—both the Blake type and the overhead eccentric type—which can be overcome through the inventive construction. On the overhead eccentric type, by the nature of the suspension of the movable jaw, there is a rotary motion imparted to the upper portion of the jaw by the eccentric shaft, whereas the lower end of the jaw has a reciprocating motion imparted by the lever action of the toggle plate, with a transition zone in the center of the jaw. As a result of this mechanical linkage, the upper part of the jaw is only performing a crushing operation during half its work cycle, and during the other half material is being permitted to fall by gravity downward in the crushing chamber. Similarly, the lower half of the jaw is actually performing a crushing operation also during only half of its work or rotating cycle, the other half, again, being used only for the discharge of the material, and the cycles of the upper and lower halves of the jaws do not coincide, but are offset in time by about 90°.

Normally, the feed opening of the crusher has five to ten times the area of the discharge opening. This poses a serious problem, since as the large rock particles are broken, they occupy a greater space through the increase in air space or voids surrounding the smaller particles, the problem being that of removing the already crushed material as quickly as possible in the interest of increased efficiency. The instant invention greatly reduces this problem, since the high teeth and deeper valleys on the lower extremity of the stationary jaw substantially increase the effective area of the discharge opening. In actual practice, this increase is in the area of 25–50%. Further, with the deep valleys, the fine material tends to flow down these valleys rather than down the crown of the teeth, reducing the abrading action on the teeth and increasing their wearing life.

The invention here solves the problems characteristic of prior art crushers through the use of massive teeth, wherein the upstanding side walls of the tooth are includable within an angle of from about 30° to about 60°, and preferably within the range of 30–40°.

Figure 2:
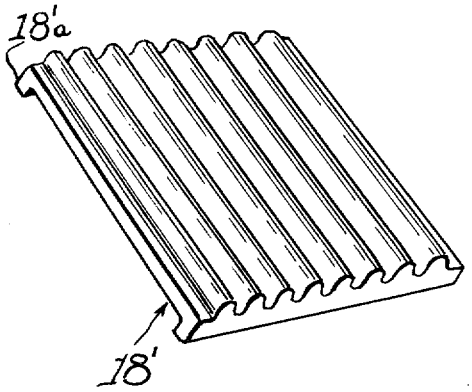
FIG. 2 is a perspective view of a jaw die employed in the construction of FIG. 1.

[A jaw die employing this construction is seen in perspective form in FIG. 2, and corresponds to the die marked 18 in FIG. 1.]

Figure 3:
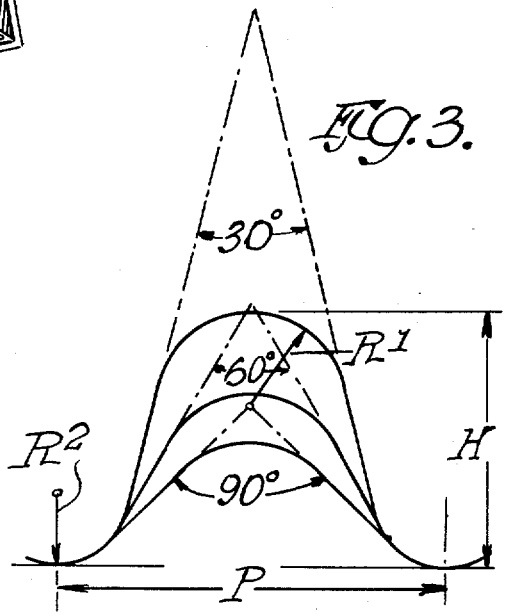
FIG. 3 is a diagram showing the dimensional relations used in jaw tooth construction.

FIG. 3 is a diagram showing how the height of the tooth increases with decrease in includable angle. In FIG. 3, it is also seen that the crown radius $R^1$ is of the order of one-quarter the pitch length P, while the root or valley radius $R^2$ is about one-sixth the pitch length. With the much deeper and much wider root, or space between the teeth provided by the construction herein, the fine materials generated by crushing tend to flow down these corrugations, reducing the abrasive action against the jaws. It will be appreciated that the new tooth shape greatly increases the amount of metal in the teeth—greatly extending the life of the jaws.

Previously, the art workers were usually limited to tooth heights H of less than about 50% of the pitch length, i.e., the distance between adjacent corresponding points on opposite sides of a given tooth. Ordinarily, the pitch length will range from 2″ to 6″. I find that it is advantageous to exceed the prior art limitation, but stay within about 85% of the pitch dimension for the height. For example, with a 30° included angle between opposite sides of the tooth, a height of about 65% of the pitch length is advantageous.

I have found that as the crown radius increases there is a loss in tooth height which reduces the leverage in crushing and the wear life of the jaw. If, on the other hand, the crown radius gets smaller, a gain in height is realized but an unstable structure results which deforms in service, causing the jaw to lose its efficiency. The determination of efficiency often depends upon a specific installation. Where rock is being crushed, there may be several stages of crushing, and inefficiency in one stage compounds itself by failing to provide the necessary distribution of rock sizes for subsequent screening and crushing. I find that the efficiency in a three-stage crushing operation may be increased as much as 25% or more, and this has been achieved when both the stationary and movable jaws are equipped with the new jaw dies. In some cases, it may be desirable to use the novel die on only one jaw, and, in such case, my preference is for use on the stationary jaw. Some installations require that the movable jaw be smooth or uncorrugated.

The jaw dies of the instant invention are generally symmetrical about a horizontal center line so as to permit reversal. Ordinarily, the greatest area of wear is in the lower 10 to 33% of the jaw die, so that reversal is advantageous.

The jaw die can be advantageously constructed of a modified manganese alloy steel such as a modified Hadfields steel. The unmodified Hadfields steel has about 11–14% manganese and a yield point of about 57,000 p.s.i. By the addition of 0.75–2.5% chromium or molybdenum, the yield strength is increased to about 62,000 p.s.i. for the chromium type and 65,000 for the molybdenum type, a preferred range being 60,000 to 70,000 p.s.i.

I prefer also to use lighter backs, i.e., less thickness in the supporting side of the die, and this, along with the wider roots characteristic of the instant invention, gives better quenching characteristics for the steel alloy. A manganese alloy steel is low in thermal conductivity and rapid quenching is essential to develop the best physical characteristics, i.e., toughness and shock resistance, along with wear resistance. I find that by changing the pattern of the steel allocation in the die, using bigger roots and more massive teeth with thinner backs, the teeth are more nearly self-supporting, with the large crown radius lending rigidity to the tooth member.

In the illustration given to FIGS. 4, 6 and 7, it is seen that the stationary jaw 10 and the movable jaw 11 are each symmetrical about a horizontal line or center plane—therefore, the end views seen in FIGS. 6 and 7 can be taken from either the upper or rock-entering end of the crusher, or from the lower or rock discharge end of the crusher. Ordinarily, the feed opening is from 5 to 15 times the size of the discharge opening. As can be most readily appreciated from FIGS. 6 and 8, the stationary jaw is equipped with vertically-extending corrugations or teeth 19. The teeth 19 decrease in their root-to-crown dimension in proceeding from either end to the center line. For example, in FIGS. 6 and 8, which represent end views, the flute of the corrugated surface has a root-to-crown dimension at the end of about three inches. This decreases to two inches at the horizontal center line, with the crown of the tooth being relatively straight and the root being curved to provide the varying height of the tooth.

On the other hand, the movable jaw confronting the stationary jaw 10 is characterized by a different tooth or flute 20. The flute or tooth 20, in proceeding along the length thereof from either end of the center line, increases in its root-to-crown dimension from 2″ to 3½″.

In the case of both jaws, however, the transverse or horizontal curvatures are the same. As can be appreciated from a comparison of FIGS. 8 and 9, the crown curvatures are all established by radii of about 1½", while the root curvatures are established by radii of the order of ¾". In both cases, the pitch dimension is the same, about 5¼". In FIGS. 8 and 9, the line M designates the median of the maximum height teeth, and it is seen that the tooth thickness is slightly greater than the valley thickness, being in relation to the crown and root radii, respectively.

From the foregoing, it is seen that in the illustration given the radius of the root is one-seventh the pitch dimension, i.e., 0.75/5.25, and that the crown radius in the illustration given is two-sevenths the pitch length. With a crown radius of ¼ the pitch length, a root radius of ⅙ the pitch length for a tooth having walls includable within a 35° angle and having a height of 65% the pitch dimension, the length of the tooth median is 56.5% of the pitch length. As the character of the tooth varies between 30° and 60° included wall angle, crown radius of ¼ to 11/40 the pitch dimension, the root radius of 1/7 to ⅙ the pitch dimension, and tooth height of 50% to 85% the pitch dimension, the length of the tooth median will vary between 55% and 60% of the pitch dimension. The valley median thus varies between 45% and 40% of the pitch dimension.

Both jaws 10 and 11 are characterized by what might be considered essentially planar backs as at 10a and 11a. In each case, however, the rear or remote side 10a or 11a, as the case may be, may optionally be relieved as at R (see FIG. 5) to lower the weight of the casting while providing stiffening ribs as at S and S'. The bearing surfaces of the stiffening ribs S and S' are finished, however, as at F to define the interrupted planar backs previously referred to.

In essence, it will be seen that the movable jaw 11 has a flute or tooth shorter on the ends and higher in the middle as at 20b in FIG. 4. In converse fashion, it will be seen that the tooth height of the stationary jaw is the least at the center as at 19b, while again the backing portion as 10c remains constant in thickness throughout the height of the jaw.

It is believed that the invention can be better understood by those skilled in the art by the recital of a specific embodiment of the invention, and, for that purpose, the following example is set down.

EXAMPLE

A stationary jaw 10 was constructed having teeth of the character seen in FIG. 8, with eight teeth being provided in side-by-side fashion, yielding a dimension between outermost crests as at 19a in FIG. 6 of 36¾". The overall width of the jaw, including the cheek plates, was 44½". The vertical dimension was 60¼", with the recesses being provided as shown in FIG. 5.

The mating movable jaw 11 had only seven teeth arranged in side-by-side relation so as to fit the seven spaces developed by the eight teeth 19 in the stationary jaw 10. The overall width of the movable jaw as seen in FIG. 7 was 41¼".

Although the theory of the invention insofar as this modification is imperfectly understood, it is believed that the relative sizes of the stationary and movable teeth operate to compensate for the greater wear received on the lower portion of the stationary jaw and yielding a much deeper root at the end of the stationary jaw, making for a greater discharge volume in the fine zone. The movable jaw, on the other hand, has a shorter tooth on the ends and a thicker or higher tooth centrally. This develops a more uniform wear pattern, particularly on large crushers.

From the foregoing, and particularly from reference to FIGS. 8 and 9, it will be seen that the grooves at the horizontal center of the stationary jaw are much shallower than those in the movable jaw in the corresponding location. Considering the end projection of the tooth or corrugation 19 in FIG. 8, it will be seen that the groove depth at this central point is about one-half the total jaw projection, while it is about three-fourths in the movable jaw. On the other hand, the groove depths at the ends of the jaws relative to the total projected height of the teeth or corrugations in each jaw, are the same.

While in the foregoing specification I have set down a detailed description of an embodiment of the invention for the purpose of illustration thereof, many variations in the details herein given may be made by those skilled in the art without departing from the spirit and scope of the invention.

I claim:

1. For a crusher for rock, and the like, the improved, replaceable jaw die comprising a plate-like body having a vertically corrugated working face, said face being characterized by elongated, vertically-extending, spaced-apart, generally identical teeth and generally identical valleys defining, respectively, adjacent crowns and roots, with the spacing between corresponding points on adjacent teeth constituting the pitch dimension, each of said teeth at the point of greatest tooth height having:

upstanding side walls includable within an angle of from about 30° to about 60°, a root-to-crown dimension from about 50% to about 85% of the pitch dimension, and the median thickness of the tooth being slightly greater than the median thickness of the valley.

2. The structure of claim 1 in which the crown radius is about one-fourth of the pitch dimension, and the root radius is about one-sixth of the pitch dimension.

3. The structure of claim 1 in which the height of each tooth is varied along the length thereof.

4. The structure of claim 3 in which the variation of tooth height provides a minimum root-to-crown dimension in the center of the length of the tooth, whereby the said die is adapted for use as a stationary jaw.

5. The structure of claim 3 in which the variation has a maximum root-to-crown dimension in the center of the length of the tooth, whereby the said die is adapted for use as a movable crusher jaw.

6. In a crusher for rock, and the like, the improved, replaceable jaw die comprising a plate-like body having a vertically corrugated working face, said face being characterized by elongated, vertically-extending, spaced-apart, generally identical teeth and generally identical valleys defining, respectively, adjacent crowns and roots, with the spacing between corresponding points on adjacent teeth constituting the pitch dimension, each of said teeth at the point of greatest tooth height having:

upstanding side walls includable within an angle of from about 30° to about 40°, a root-to-crown dimension from about 50% to about 85% of the pitch dimension, and the root radius being about one-sixth of the pitch dimension and the crown radius being about one-fourth of the pitch dimension.

7. In a crusher jaw for rock, and the like, the improved replaceable jaw die comprising a plate-like body having a vertically corrugated working face, said face being characterized by elongated, vertically-extending, spaced-apart, substantially identical teeth and substantially identical valleys defining respectively adjacent crowns and roots with the spacing between corresponding points on adjacent teeth constituting the pitch dimension, each of said teeth at the point of greatest tooth height having upstanding side walls includable within an angle of from about 30° to about 60° and a root-to-crown dimension from about 50% to about 85% of said pitch dimension, the median thicknesses of each tooth and valley being in the range of about 40% to about 60% of the pitch dimension.

8. In a crusher jaw for rock, and the like, the improved replaceable jaw die comprising a plate-like body having a vertically corrugated working face, said face being characterized by elongated, vertically-extending, spaced-apart, substantially identical valleys defining respectively adjacent crowns and roots with the spacing between corresponding points on adjacent teeth constituting the pitch dimension, each of said teeth at the point of greatest tooth height having upstanding side walls includable within an angle of from about 30° to about 40° and a root-to-crown dimension from about 50% to about 85% of said pitch dimension.

9. In a crusher jaw for rock, and the like, the improved replaceable jaw die comprising a plate-like body having a vertically corrugated working face, said face being characterized by elongated, vertically-extending, spaced-apart, substantially identical teeth and substantially identical valleys defining respectively adjacent crowns and roots with the spacing between corresponding points on adjacent teeth constituting the pitch dimension, each of said teeth at the point of greatest tooth height having upstanding side walls includable within an angle of from about 30° to about 60° and a root-to-crown dimension from about 50% to about 85% of said pitch dimension and both crowns and roots being generally rounded in the direction transverse of the tooth length on radii at least about one-seventh said pitch dimension.

References Cited by the Examiner

The following references, cited by the Examiner, are of record in the patented file of this patent or the original patent.

UNITED STATES PATENTS

| | | | |
|---|---|---|---|
| 1,400,257 | 12/21 | Bechaard | 241—291 X |
| 1,748,879 | 2/30 | Harrison | 241—291 |
| 1,849,935 | 3/32 | Kropp | 241—291 |
| 2,122,033 | 6/38 | Hallenbeck | 241—264 |
| 2,566,583 | 9/51 | Shelton | 241—286 X |
| 2,950,871 | 8/60 | Smith | 241—291 X |

FOREIGN PATENTS

| | | |
|---|---|---|
| 573,804 | 4/59 | Canada. |

OTHER REFERENCES

"Manganese Steel for Crusher, Grinding Mill and Pulverizer Parts," published by the American Brake Shoe and Foundry Company on May 20, 1942. Bulletin No. 642–C.

ROBERT C. RIORDON, *Primary Examiner.*

J. SPENCER OVERHOLSER, *Examiner.*